United States Patent
Graves

[11] 3,719,098
[45] March 6, 1973

[54] PULLEY BELT ASSEMBLY

[75] Inventor: Howard K. Graves, Cleveland, Ohio

[73] Assignee: Olin Corporation, New Haven, Conn.

[22] Filed: March 22, 1971

[21] Appl. No.: 126,535

[52] U.S. Cl. ............... 74/216.5, 74/230.5, 74/230.8, 74/231 M, 74/241

[51] Int. Cl. .......... F16h 55/36, F16g 1/00, F16h 7/18

[58] Field of Search ..... 74/241, 231 M, 230.8, 230.5, 74/230.14, 216.5

[56] References Cited

UNITED STATES PATENTS

| | | | |
|---|---|---|---|
| 2,660,429 | 11/1953 | Lorig | 74/241 X |
| 2,720,692 | 10/1955 | Lorig | 74/241 X |
| 2,751,067 | 6/1956 | Nicholson | 74/241 X |
| 1,944,776 | 1/1964 | Arnold | 74/230.8 UX |
| 2,484,752 | 10/1949 | Searles | 74/230.5 |
| 2,632,560 | 3/1953 | Wright | 74/230.5 X |
| 2,721,739 | 10/1955 | Mursch et al. | 74/241 X |
| 3,225,902 | 12/1965 | Roinestad | 74/241 X |
| 3,303,924 | 2/1967 | Hartzell, Jr. | 74/241 X |
| 3,621,728 | 11/1971 | Steorts, Jr. | 74/241 |

*Primary Examiner*—Leonard H. Gerin
*Attorney*—Chittick, Pfund, Birch, Samuels & Gauthier

[57] ABSTRACT

A flat belt pulley transport employs spaced pulleys each constructed as a set of radially slotted discs which are flexible in response to transverse forces imparted between the belt and pulley. The belt is retained on the pulleys by spaced non-rubbing guides which deflect the belt back to tracking position whenever a transverse movement of the belt occurs. The flexible ribs of the discs minimize both lateral forces tending to detrack the belt and corresponding resistance to restoring forces from the guides. Where a sprocket drive is used the sectors between slots are also flexible in the direction of belt motion to compensate for sprocket and hole misalignment.

15 Claims, 15 Drawing Figures

PATENTED MAR 6 1973 3,719,098

INVENTOR
HOWARD K. GRAVES
BY Chittick, Pfund, Birch,
Samuels & Gauthier
ATTORNEYS

INVENTOR
HOWARD K. GRAVES

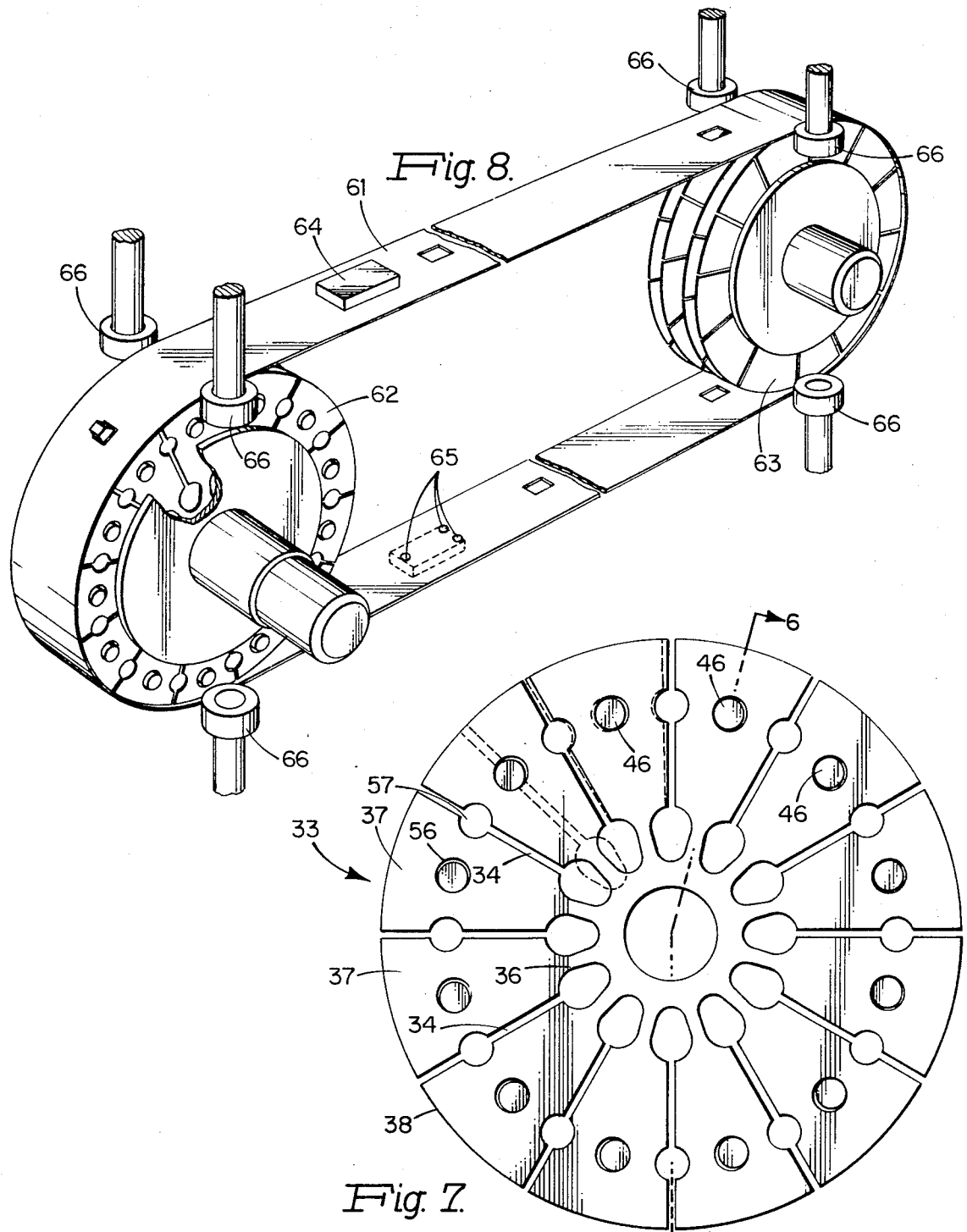

INVENTOR
HOWARD K. GRAVES
ATTORNEYS

PULLEY BELT ASSEMBLY

BACKGROUND OF THE INVENTION

This invention relates to endless belt transports and power drive arrangements and particularly to pulleys used to drive thin flat belts such as metal belts which are used for power transmission from one pulley to another or as a transport carrier for an object moving with the belt.

A wide variety of pulley and belt systems are known in the prior art with various arrangements relied upon for causing the belt to track on the pulley. Thus V-belts and pulleys with flanges have been used and for flat flexible belts the use of the crown pulley which automatically tracks providing the spaced pulleys are in reasonable alignment are well known. Where thin flat belts are used which are relatively stiff and hence not readily guided on a crowned pulley, various other means are often employed. Thus for belts which can be used with sprocket holes it is customary to employ sprocket wheels which have projections which engage the sprocket holes in the belt to prevent belt runoff and furthermore to preserve a synchronized relation between the driving and driven members if desired. Where flat belts are required which are relatively stiff and have other properties such as high strength and cleanliness, for example, it has been found that metal belts best fulfill the diverse requirements imposed by a wide variety of applications and these belts at times must be guided without resort to sprockets and sprocket holes in the pulley and belt respectively. In such applications it has been found that providing fixed guides to make the belt track on the pulleys subjects both the edge of the belt and the guide to severe wear and deterioration due to the large transverse forces which can be developed in a high-speed transport due to a minute misalignment and the magnified effect such forces have when the belt is attempted to be constrained by guide members rubbing against the thin edge of a rigid belt.

In the prior art various flexible tooth sprocket drives have been provided primarily to accommodate wear or other relative dimensional change between the spacing of the teeth on the sprocket wheel and the mating structure carried by the belt. Thus U. S. Pat. No. 2,487,870 shows a film drive sprocket wheel, one side being a disc with teeth driven in the circumferential direction by an eccentric axial cam to accommodate the dimensional changes due to shrinkage in motion picture film engaging the sprocket teeth. In U. S. Pat. No. 3,173,301 a conventional sprocket or gear wheel is shown with radial slots at the root of the space between teeth thereby permitting the teeth to flex circumferentially to fit the irregular spaced engaging surfaces of a worn gear or chain drive.

SUMMARY OF THE INVENTION

In accordance with the present invention a thin flat belt connecting two or more pulleys or sprockets to form a power transmission or transport system is arranged to track the pulleys with or without rubbing or continuous contact guide members by employing novel pulley construction which provides the necessary structural integrity for along the belt driven forces and supporting the belt tension including the load on the belt while at the same time providing relatively resilient support for the belt transverse to its direction of motion with the result that tracking errors from whatever cause which tend to cause the belt to detrack do not result in large transverse forces on the belt. In the specific disclosed embodiment of the invention the pulley drive and idler members are formed of a plurality of equal diameter discs which have radial slots which subdivide the disc into a plurality of sectors each of which is supported at the hub and has a free end defining a portion of the support surface of the pulley which contacts the belt. With this configuration radial loading due to static tension in the belt is adequately supported to maintain the effective cylindrical working surface of the pulley while the transverse forces which develop because of slight misalignment, belt inaccuracies and other imperfections in the geometry of the layout or non-uniformities of materials or the like are transmitted between the belt and the pulley by the flexible disc sector member with the result that the power input to the belt for such misalignment is reduced and the resistance of the pulley surface to a restoring force applied at the edge of the belt by the normally non-contacting belt guides is effective to return the belt after deflection to a tracking position on the pulley.

Where the characteristics of a sprocket drive are useful the present invention can be employed with an auxiliary hub which does not provide surface support for the metal belt but which does carry the appropriate number of sprocket teeth to the peripheral surface at which the belt is supported where the teeth can engage with holes placed in the belt to maintain precise synchronism or for power drive engagement as required.

It is accordingly the principal object of the present invention to provide a drive for a flat thin belt having high resistance to transverse deformation such as a metal belt in which the belt is radially supported at a cylindrical drive surface but in which the surface contact with the belt has incremental subdivisions which are laterally deflectable under relatively low forces for the purpose of preventing misalignment forces from being transmitted and energy buildup due to misalignment occurring due to the lateral deflection of such increments without impairing the capability of the driving contact between the pulley and the belt in the direction of belt motion. A further object of the invention is to guide a belt pulley assembly of the type hereinbefore described with spaced guides which do not contact the belt continuously but rather serve to deflect the belt back toward a tracking condition once the belt has moved slightly from a true aligned condition due to misalignment errors. A further feature of the invention is obtained by the employment of the guide pulleys which minimize transverse force buildup and spaced guides which serve to limit transverse displacement of the belt and apply restoring force which results in the attainment of tracking relation due to the ease with which the pulley surface increments deflect transversely in response to the restoring force thereby permitting the belt to be moved into an aligned tracking condition with minimum force and wear on the belt edge and guide member.

The foregoing objects and features of the invention will be apparent from the following detailed description taken in conjunction with the accompanying drawings wherein:

FIG. 7 is an elevation view of one of the discs used in the pulleys shown in FIGS. 5 and 6.

FIG. 8 is a perspective view of a pulley belt drive assembly showing further details of the guides and the spacing to accommodate fasteners used to mount objects on the surface of the belt.

FIG. 9a-e show various representations of tracking errors and their causes which can exist in a pulley belt system.

Figure 10:
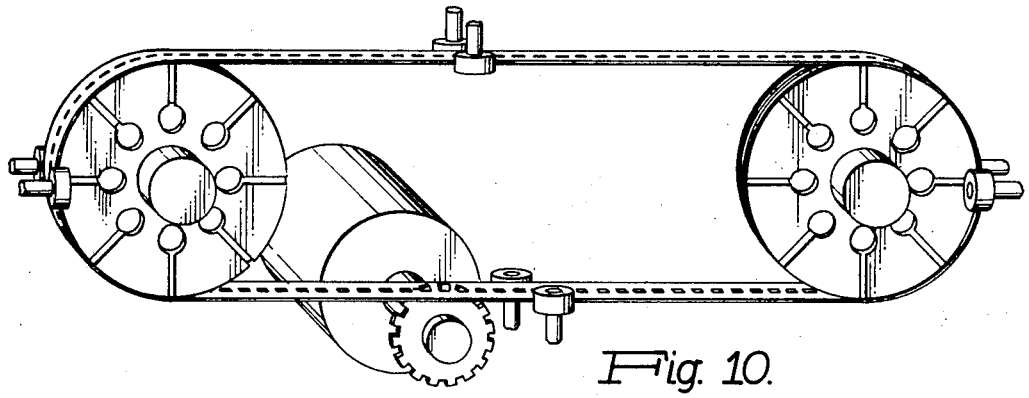

FIG. 10 is a perspective view of a modification showing separate sprocket drive employed with the pulley belt system of the invention.

Figure 11:
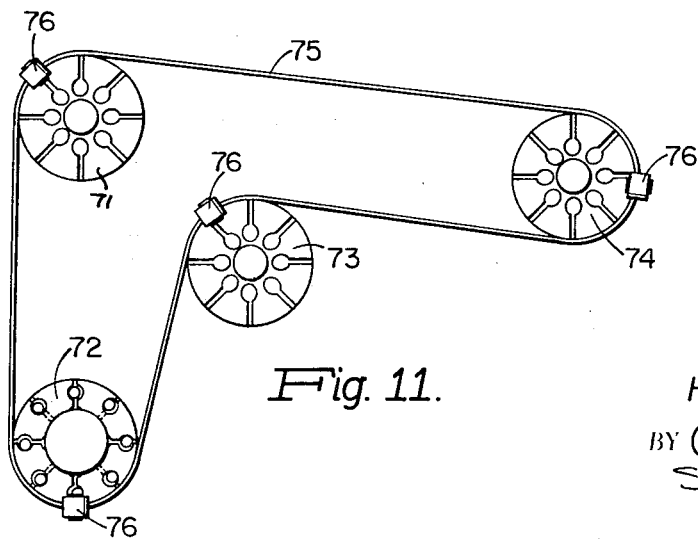

FIG. 11 is an end elevation showing a drive pulley and a plurality of idler pulleys in accordance with the invention.

DESCRIPTION OF THE PREFERRED EMBODIMENT

Figure 1:
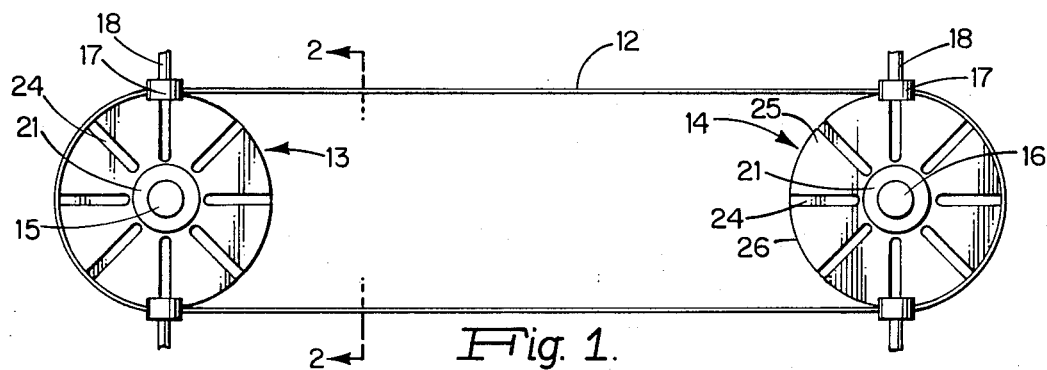
FIG. 1 is a side elevation of a pulley belt assembly with guide rollers located at the contact point of the belt and pulleys.
Figures 2, 4:
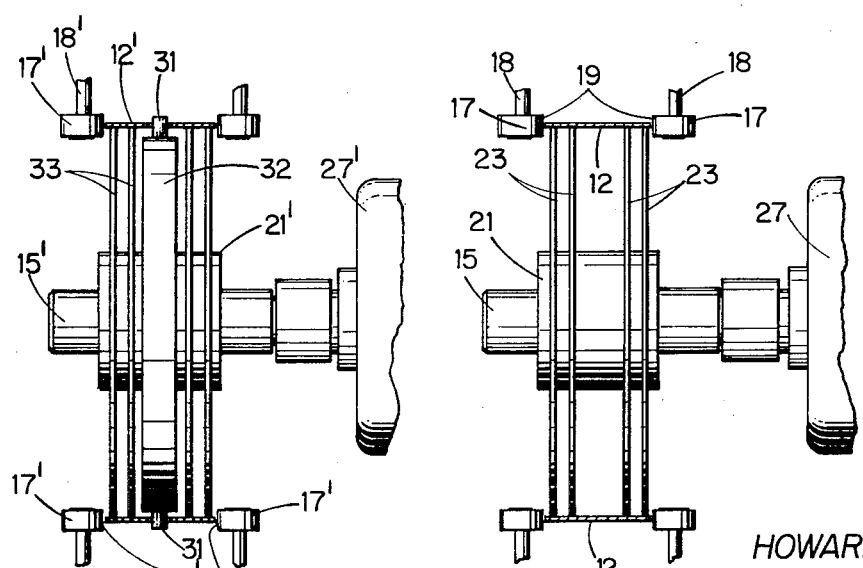
FIG. 2 is a sectional view taken along the line 2—2 of FIG. 1 with cylindrical portions not sectioned.
FIG. 4 is a sectional view on line 4—4 of FIG. 3 with cylindrical members not sectioned.

Referring now to FIGS. 1 and 2 the general features of a friction belt pulley drive system will be described.

A thin metal belt 12 is tensioned between a drive pulley 13 and an idler 14 which rotate on spaced parallel axes 15-16. As shown in the simple two pulley system of FIG. 1 the belt 12 contacts the respective pulleys 13 and 14 over 180° of circumference on each pulley sector and enters and leaves contact with the respective pulleys at diametrically opposed points of tangency. At these entrance and exit points of contact on each pulley are positioned a pair of spaced roller guide members 17 which rotate about vertical axes 18 and present to the belt 12 cylindrical spaced roller surfaces 19 which are centered from the desired line of travel for the belt 12 and spaced slightly greater than the width of the belt 12. The height of the surfaces 19 is relatively small and can be made adequate to assure edge contact with the belt 12 whenever the belt wanders from the desired center line of travel. The rollers 17 supplying the rotating guide surfaces 19 may, for example, be merely ball bearings with the outer guide surfaces 19 constituting the cylindrical outer surface of the outer race and with the inner-face mounted on the shafts 18 thereby rotatably supporting the outer race surfaces 19.

The pulleys 13 and 14 comprise a hub 21 supported on the respective drive shaft 15 or journalled idler shaft 16. The hub 21 supports a plurality of parallel discs 23 which are fixed relative to rotation on the hub 21 but which are transversely flexible by virtue of a plurality of radial slots 24. The slots 24 subdivide each of the discs 23 into a plurality of finger sectors 25, the outer edges 26 of which define a cylindrical supporting surface for the belt 12. As will be set forth hereinafter in detail the cylindrical supporting surface provided by the outer circular edges 26 of the fingers 25 provide through transverse motion under load for the improved characteristics of the pulley belt drive in accordance with the invention. As indicated in FIG. 2 the shaft 15 may be driven in rotation from any suitable drive source such as motor 27.

Figure 3:
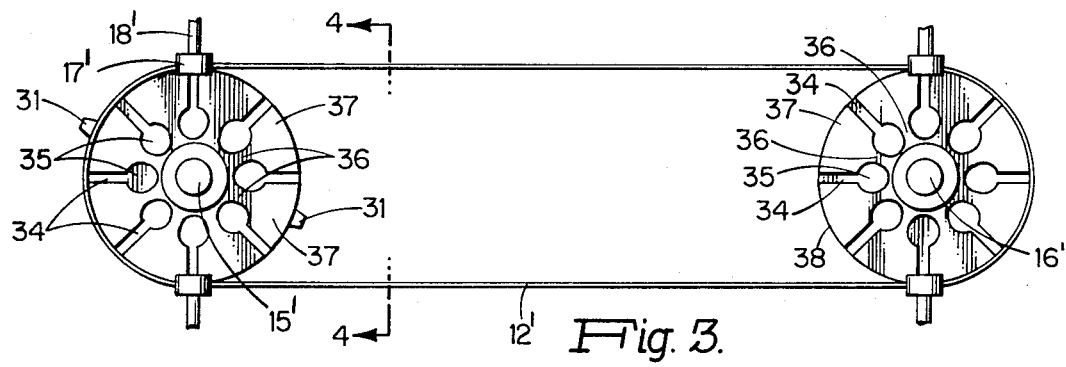
FIG. 3 is a view similar to FIG. 1 of a modification which employs sprocket teeth on the pulleys and sprocket holes in the belt.

Referring now to FIGS. 3 and 4 a modification of the invention useful for sprocket drive pulley belt arrangements will be described. In FIGS. 3 and 4 belt 12' is essentially the same as the belt 12 of FIG. 1 except for a plurality of equally spaced sprocket holes therein. These sprocket holes are engaged by sprocket teeth 31 which are supported on a central disc 32 fixed to hub 21'. The disc 32 has a diameter less than the diameter of the belt supporting disc 33 and serves primarily to support the sprocket teeth 31 which project far enough above the surface of the disc 32 to project through sprocket holes in the belt 12'. Other portions of the assembly which are identical or serve identical functions as previously set forth with respect to FIGS. 1 and 2 are shown in FIGS. 3 and 4 with the same reference characters primed. These include the spaced rollers 17' mounted on shafts 18', drive shaft 15' and rotative motor power source 27'.

The discs 33 in FIGS. 3 and 4 may be of the same general construction as previously described fro the discs 23 but slots 34 differ in that they terminate at their root in an enlarged opening 35 which defines a relatively long and narrow support column 36 for each sector 37. This enlarged root opening 35 and the relatively long slender support column 36 give the individual sectors 37, in addition to their transverse flexibility as provided in the species shown in FIG. 1, a circumferential or angular flexibility in the direction of belt travel. This degree of freedom has been found useful where a sprocket and sprocket hole engagement is needed, such as in synchronized drives or positive registry type systems, in order to compensate for the effect of the belt 12' attempting to ride up on the sprocket tooth 31 whenever misalignment occurs and transverse flexure of the sectors 37 occurs as track deflecting and correcting forces are applied by the spaced guide rollers 17' all as hereinafter described in accordance with the invention. As previously described this corrective action takes place even though guide rollers 17' are spaced a small but definite distance apart greater than the width of the belt 12'.

Figure 5:
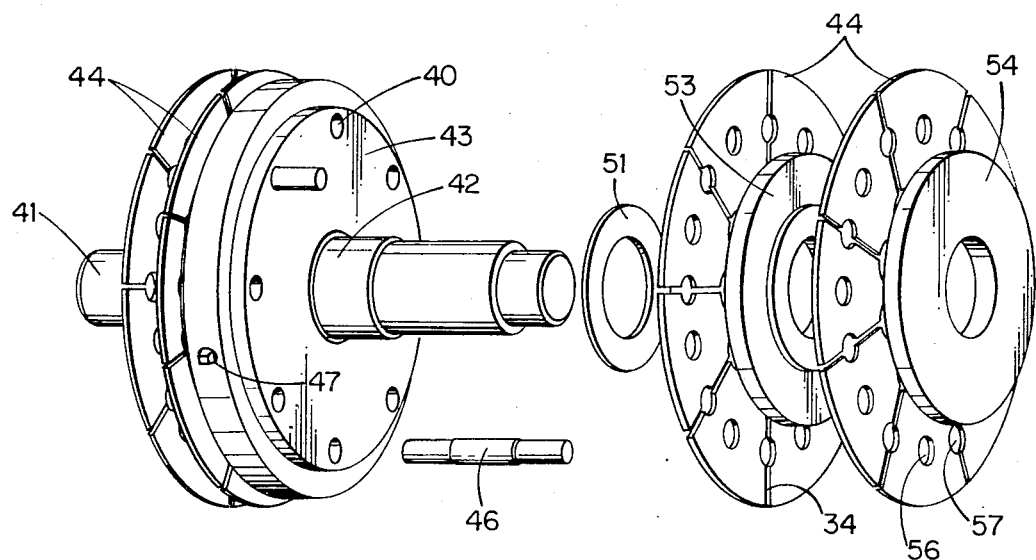
FIG. 5 is an exploded view showing further details of the pulley construction shown in FIG. 2.
Figure 6:
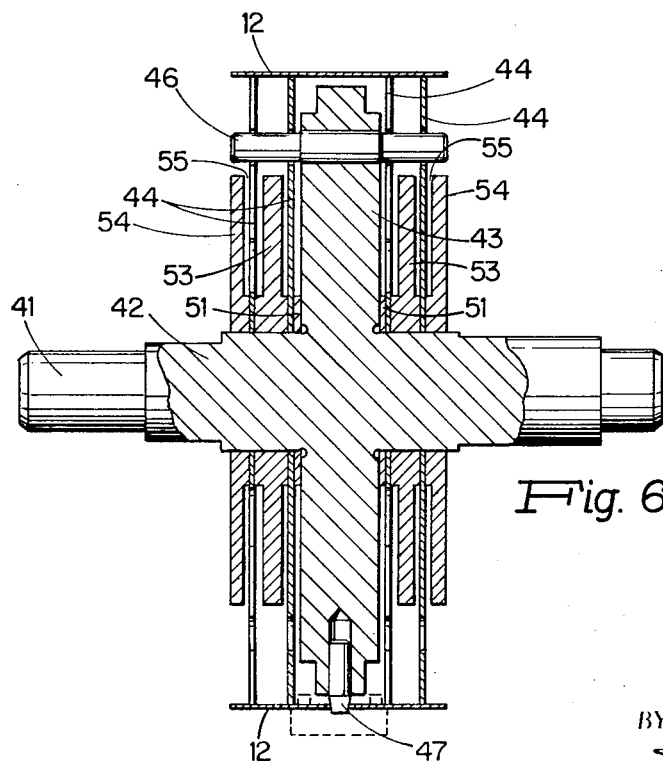
FIG. 6 is a section on line 6—6 of an assembled pulley using the type disc shown in FIG. 7.

Referring now to FIGS. 5, 6 and 7 the detailed construction of a sprocket drive pulley in accordance with the invention will be given. In FIGS. 5 and 6 a support shaft 41 has an integral central portion 42 of enlarged diameter from which at a central position a sprocket supporting disc 43 is formed having an outer surface at a diameter slightly less than the belt support surfaces of a set of adjacent discs 44. The disc 43 has a set of equispaced holes 40 parallel to the axis of shaft 41 in which are supported by press-fit a plurality of Delrin rods 46. Radially inserted in the outer cylindrical surface of the disc 43 are a plurality of sprocket teeth members 47.

Mounted on the enlarged diameter portion 42 of the shaft 41 are a plurality of slotted discs 44 of the type shown in FIG. 7 together with spacer structure to form the desired assembly. The discs 44 and the spacer structures all have a central bore of approximately the same size as the diameter of the portion 42 but preferably somewhat undersized so that the parts can be press-fit or sweated into fixed contact with the surface 42.

The sequence of assembling the parts as seen in FIGS. 5 and 6 includes a central spacer-washer 51 adjacent each side of the central disc 43 against each of which one of the discs 44 is pressed followed by double-hub spacers 53 against which the remaining two discs 44 are pressed with the outer discs 44 further retained by single-hub spacers 54. As can be seen the double-hub spacers 53 and the single-hub spacers 54 have a collar having the same diameter as the inner spacer-washers 51 which is dimensioned to lie just below the diameter position of the root of the enlarged portions of the base of the slots 34. The width of the collars on the spacers 53 and 54 as well as the width of the spacer-washer 51 are such as to firmly anchor the hub portion of the disc 33 and support it rigidly to the shaft portion 42. The portions of the spacers 53 and 54 which have a greater diameter than the actual hub portion thereof form a circumferential groove in which at the outer periphery of the hubbed spacers 53 and 54 provide limit stops upon lateral deflection of the discs 44. As best seen in FIG. 7 the sector fingers, formed between the radial slots 34, each contain a central hole 56 and an edge hole 57 formed half-and-half in the opposed edges of adjacent sectors 37 on the opposite sides of each slot 34. This set of holes has a diameter somewhat in excess of the diameter of pin 46 which projects from the disc 43 and serves to control the angular or circumferential deflection of the sectors 37. For this purpose the adjacent discs are oriented with a relative position rotated one hole spacing so that any given pin 46 passes through a hole 56 in the center of the sector on one disc and through a hole 57 in the edge of a disc on the adjacent disc 44. This relative arrangement is clearly seen in the exploded view FIG. 5. As indicated in FIG. 7, the pins 46 rest against one edge of the holes 56, 57 when the pulley is supplying drive power to the belt and the angular deflection of the teeth 37 occurs relative to the sprocket teeth 47 from this normal drive position against the pin 46. As so assembled, the sectors 37 of the drive pulley are supported by the reduced cross-section radial support 36 which has a length and cross-section such as to provide rigid radial strength for the forces bearing against the cylindrical edge surfaces 38 while permitting lateral deflection and angular or circumferential deflection of the sectors 37 to accommodate misalignment loading.

FIG. 8 shows an application of the pulley belt drive system of the type shown in FIGS. 1 and 3 wherein a belt 61 is tensioned between two pulleys 62, 63 of the type heretofore described. The belt 61 may carry any suitable member 64 on its surface such as a conveyor scoop or other product engaging member or if the application involves the transport of some instrumentality for repeatedly traversing a given path such instrumentality can be attached as at 64 to the belt 61. In attaching the member 64 to the belt 61 fastening members 65 may conveniently project through the belt 61 at positions to pass between the spaced discs 44 thereby avoiding any disruptive contact between the undersurface of the belt and the pulley supporting surfaces 38. Suitable roller guide members 66 may be positioned adjacent the belt 61 and spaced equal to or slightly greater than the width of the belt.

Referring to FIGS. 9a–e, a number of views in the nature of top plan views of pulley belt systems exhibiting various misalignment and tracking defect causes are represented. In these views the error illustrated is generally shown in exaggerated form for the purposes of illustration. It will readily be understood that a minute misalignment or structural defect will be greatly multiplied in terms of the cumulative effect of such error in causing the belt to detrack or attempt to run out from an equilibrium and aligned tracking position on the pulleys. This cumulative effect has been found to develop such substantial forces that the use of thin high-strength belts such as stainless steel belts and the like has been inhibited due to the problems associated with accommodating these misalignment forces on the belt. In particular, attempts to use flanged pulleys and other edge retaining structures have caused severe wear on both the flange or guide structure and the edge of the metal belt itself to the extent that the useful life of the installation is unduly shortened.

It will be recognized that the reason restraining forces are required on such installations is due to the non-automatic tracking nature of the flat pulley-rigid belt assembly. Thus with strong metal belts of extremely thin dimensions which operate under substantial tension, the transverse dimension of the belt remains relatively stiff and the use of crown pulleys as employed in fabric and the like belts is ineffective to develop a structure which is self-tracking to maintain equilibrium without edge guides. The present invention overcomes the shortcomings of the prior art with respect to non-self-aligning belt drive systems by providing a relatively fluid surface for the drive and idler pulleys on which the belt runs, which surface nevertheless is radially rigid so that the tension in the belt may be maintained and the requisite power transmitted between the drive pulley and belt. Thus in the food processing industry, for example, the use of stainless steel belts is highly desirable because of their inherent absence of dust and other surface abraded contaminants as well as the ability of such materials to withstand high temperature cleaning and sterilization. In food processing such belts can be used to transport food materials conveyor fashion and maintain the requisite sanitary standards. In high precision applications it is the strength of the belt and its ability to carry substantial load without elongating or sagging as it makes its run over predetermined path that is highly desirable. Such applications include facsimile scanning systems where the belt carries a stylus or an optical device for sensing a light pattern image along the path which the belt traverses. Many other applications of strong thin metal belts or similar construction exist and the present invention is applicable to such systems without the usual limitations and shortcomings imposed by guide slots, flanged pulleys and various other appurtenant structures which can either accumulate contaminants or cause force build-up and misalignments or belt chattering relative to the desired true repetitive path desired for the belt or components carried on the surface of the belt.

In accordance with the present invention, the lateral forces due to various aspects of misalignment or other inaccuracy are effectively reduced and rendered noncumulative in terms of detracking the belt relative to adjacent guide members. In particular, by providing slotted pulleys to form sectors which rigidly support the belt in radial direction but permit transverse flexure of the sector fingers upon the occurrence of a misalignment force, it has been found that the force acting to detrack the belt is greatly reduced since the resilient material of the pulley discs is such that it readily deflects laterally and resumes its normal aligned position once the pulley is rotated far enough to move that particular sector out of contact with the belt. Due to symmetry with respect to the force transmittal and reaction force system which is operative in the structure of the invention the restoring force necessary to urge the belt back into a tracking position on the pulleys is also decreased since the transversely flexible sectors of the pulley do not resist the transverse force applied by an edge guide to urge the belt back into a tracking position. Thus the rotating guide members which are adjacent the edge of the belt operate to apply restoring force whenever the belt is deflected from its true running position and this relatively low force, either continuously or intermittently applied as misalignment occurs, is not sufficient to cause serious wear or fatigue of the edge of the belt or the guide structure.

To operate as herein described, it is desirable to construct the pulley discs of a high resilience material such as stainless steel which is capable, when deflected, of absorbing the work done by the deflecting force. By temporarily storing this energy as a resiliently deflected sector on the discs the work is not absorbed by the belt and as the belt moves out of contact with the deflected sector this energy is harmlessly dissipated as the sector returns to undeflected position. This energy storage and dissipation is continuous and not cumulative with the result that the energy absorption by the belt is minimized.

For those pulley belt systems which require precise registration or otherwise need to use a sprocket and a sprocket hole drive, the additional angular deflection of the pulley sectors permits the foregoing action to take place in addition to the socket and hole misalignment compensation which is achieved by angular deflection of the sectors as required.

The foregoing description constitutes an explanation of the operation of the invention as presently understood, but it should be specifically stated that applicants are not fully aware of the exact mechanism that is taking place in the dynamics of operation of the invention and, accordingly, the invention should not be considered as limited to the presently described theory of operation.

Figure 9:
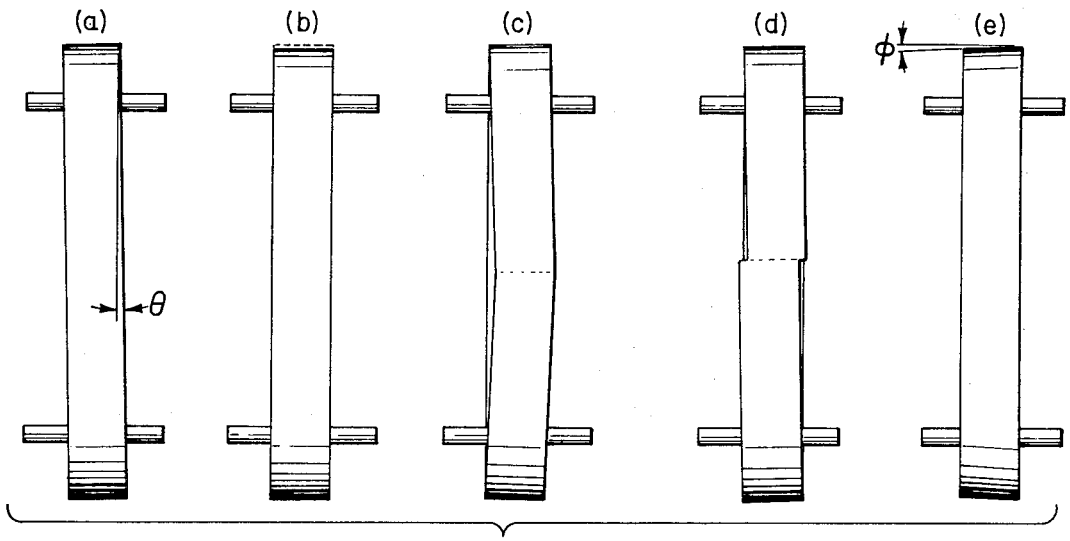

Referring back to FIG. 9, some of the various causes of detracking in the belt system which can be controlled to permit satisfactory belt operation with the present invention are shown. In FIG. 9a there is represented a slight departure from true parallelism between the spaced shafts upon which the pulleys rotate. This error is represented by the small angle $\theta$ representing the tendency of the belt to find a perpendicular position relative to the axis of rotation of the pulley around which it runs, which perpendiculars will not be colinear if the pulley shafts are not parallel. FIG. 9b represents the problem of an eccentric pulley where the effective spacing between the two pulleys varies with each rotation of the eccentric pulleys. FIGS. 9c, d and e, show problems which derive from inaccurate manufacture of the belt. Despite every precaution the discrepancies noted are unavoidable to some degree and in the demanding requirements of a metal belt precision drive even small errors of this type are extremely troublesome. FIG. 9c shows a non-perpendicular splice edge where the belt is welded resulting in an untrue track. FIG. 9d shows a similar weld error where the ends of the belt are offset. FIG. 9e shows a trapezoidal shaped belt with the small angle $\phi$ representing the difference in length between the right hand and the left hand edge of the belt. Various other errors are possible and occur quite commonly in belt drives, but the overall tendency for non-self-tracking drive systems to produce cumulative forces as a result of minute incremental alignment errors provides severe tracking problems in the prior art and such problems are minimized by the present invention.

FIG. 10 is a view of a belt drive in accordance with the present invention where the sprocket drive for the belt has been separated from the tracking and alignment function. Obviously, the invention is not to be considered as associated with any particular power transmittal device which emitter supplies power to or extracts power from the belt drive system and thus the invention is of general applicability. Where sprocket drive belts are employed as in FIG. 10 or with sprocket pulleys of the type shown in FIGS. 3 and 4, but having additional sprocket teeth, the lateral guides may be eliminated and the sprocket teeth relied upon for maintaining belt alignment.

FIG. 11 is a further representation of an application of the invention where drive pulley 72 and idler pulley 71, 73 and 74 provide a complex path of travel for the belt 75 with adjacent roller guides 76 spaced on either side of the belt provided at a number of positions to supply the restoring force to cause the belt to track after it has detracked by a small but definite amount sufficient to contact the guides 76.

Although the invention has been disclosed with the lateral guides (17 and 17') shown as rollers which are spaced wider than the width of the belt (12 and 12') it will be apparent that other guide means with either rolling or sliding contact with the edge of the belt can be used. Similarly the spacing of the guide means may be such that edge contact with the belt is more or less continuous particularly in low speed applications or where high precision tracking is not required. Thus spring load guide rollers or sliding guide shoes can be used as guides in continuous edge contact with the belt. Similarly, flanges on the pulley can be used since the reduced forces produced in this invention minimize wear and work hardening of the belt and flange contact surfaces. In such modification the advantages of the low detracking and restoring forces provided by the invention will be present.

Various other modifications and configurations of the invention will be apparent to those skilled in the art and the invention is accordingly not to be considered as limited to the presently disclosed preferred embodiments but includes all equivalents and modifications thereof within the scope of the appended claims.

I claim:

1. A belt tracking assembly comprising a pulley, a belt and guide means, said pulley defining a hub and a plurality of fingers, said fingers each having a fixed end supported by said hub and a free end supporting said belt and frictionally engageable therewith, the free end of said fingers being flexible transversely effective to minimize lateral forces causing lateral belt motion tending to detrack the belt, said guide means operative on opposite edges of said belt and being spaced from the belt and the pulley so as to limit said lateral motion whereby said pulley and belt are retained in a tracking relationship.

2. Apparatus according to claim 1 in which the free end of said fingers are each flexible universally.

3. Apparatus according to claim 2 and including sprocket teeth carried by said hub extending to project through mating sprocket holes in said belt.

4. A flangeless pulley device for a belt pulley system comprising a hub, and belt support means carried by the hub, said means defining a plurality of spokes each having a fixed end supported at the hub and a free end; said free end being frictionally engageable with the belt, said spokes being flexible for deflecting said free end to minimize lateral forces tending to make the belt run off the pulley to resist restoring forces applied to restore the belt to track thereby providing a minimum tendency for the belt to run off the pulley.

5. A belt transport comprising: spaced pulleys each have a hub supporting a
 plurality of equal diameter resilient discs,
  each of said discs having a plurality of slots separating said disc into a plurality of radially rigid and transversely flexible sector-like portions;
 a flat belt tensioned on said pulleys; and
 lateral guide means operative on said belt to maintain said belt aligned on said pulleys.

6. Apparatus according to claim 5 in which said guide means comprise transversely spaced guides located to operate at the point of tangency of said belt on at least some of said pulleys.

7. Apparatus according to claim 6 in which said guides for a given pulley comprise a pair of rollers mounted to rotate on transversely spaced axes normal to the axis of said given pulley.

8. Apparatus according to claim 5 in which said pulleys each have at least four of said equal diameter discs.

9. Apparatus according to claim 5 in which the roots of said radial slots are enlarged thereby increasing the flexibility of said sectors and relatively increasing said flexibility along the line of travel of said belt.

10. Apparatus according to claim 9 in which at least one of said pulleys includes a rigid disc of lesser diameter than said equal diameter discs said rigid disc having sprocket teeth extending to greater than said equal diameter and in which said belt has sprocket holes matching said sprocket teeth.

11. Apparatus according to claim 10 in which said rigid disc supports a plurality of fixed rods extending from the side faces of said rigid disc located at a diameter less than the diameter of said resilient discs, said resilient discs having holes therein through which said rods project with predetermined clearance.

12. Apparatus according to claim 11 in which said holes in said discs are located alternately in said sectors and in the slots between sectors and adjacent resilient discs are oriented with an angular displacement of a half-sector such that a given rod passes alternately through sector and slot located holes in adjacent discs.

13. A pulley for guiding a flat belt comprising:
 a hub; and
 a plurality of radially rigid, transversely resilient elements projecting from said hub and spaced circumferentially about the periphery of the hub and terminating in a predetermined cylindrical surface to form a belt supporting surface of said pulley.

14. The method of running a thin metal endless belt over a run defined by a plurality of pulleys comprising the steps of:
 tensioning said belt in contact with a surface portion of each of said pulleys;
 supporting said surface portion at a nominal cylindrical surface relative to the axis of rotation of each pulley respectively;
 maintaining said nominal cylindrical surface in response to radial loading from said belt while permitting resilient lateral deflection of incremental segments of said surface portion of each of said pulleys in response to transverse loading from said belt; and
 guiding said belt to run aligned with said pulleys by edge contact with said belt.

15. A belt tracking assembly comprising:
 spaced pulleys each having a hub supporting a plurality of equal diameter resilient discs,
  each of said discs having a plurality of slots extending from the periphery of each disc toward said hub, said slots separating said disc into a plurality of radially rigid and transversely flexible sector-like portions;
 a flat belt tensioned on said pulleys; and
 lateral guide means operative against the edges of said belt to maintain said belt aligned on said pulleys.

* * * * *